(12) United States Patent
Decker et al.

(10) Patent No.: US 11,682,387 B2
(45) Date of Patent: Jun. 20, 2023

(54) DIGITAL SENTIMENT SIGNATURE GENERATION

(71) Applicant: International Business Machines Corporation, Armonk, NY (US)

(72) Inventors: Renee F. Decker, Brunswick, MD (US); Michael Drzewucki, Woodbridge, VA (US); David Kenneth Sagal, II, Keyser, WV (US); James M Dixius, Fairfax, VA (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 17/102,988

(22) Filed: Nov. 24, 2020

(65) Prior Publication Data
US 2022/0165254 A1  May 26, 2022

(51) Int. Cl.
| | | |
|---|---|---|
| *G01L 21/00* | (2006.01) | |
| *G10L 15/18* | (2013.01) | |
| *H04L 51/046* | (2022.01) | |
| *G06F 16/683* | (2019.01) | |

(Continued)

(52) U.S. Cl.
CPC ........ *G10L 15/1815* (2013.01); *G06F 16/683* (2019.01); *G10L 15/26* (2013.01); *H04L 51/046* (2013.01); *G10L 25/51* (2013.01)

(58) Field of Classification Search
CPC ...... G06F 40/30; G06F 16/683; G06F 40/284; G06F 40/35; H04L 51/046; H04L 51/52; H04L 51/18; H04L 51/02; H04M 3/42195; H04M 3/2227; H04M 2201/14;
(Continued)

(56) References Cited

U.S. PATENT DOCUMENTS

| | | |
|---|---|---|
| 7,539,127 B1 | 5/2009 | Shaffer |
| 7,848,775 B2 | 12/2010 | Flanagan |
| 9,300,807 B2 | 3/2016 | Miller |

(Continued)

FOREIGN PATENT DOCUMENTS

| | | |
|---|---|---|
| EP | 1148725 B1 | 7/2006 |
| FR | 2908580 A1 | 5/2008 |

OTHER PUBLICATIONS

Doll et al., "A Machine Learning Approach to Automated Customer Satisfaction Surveys", Towards Data Science, Medium, Nov. 23, 2019, 31 Pages.

*Primary Examiner* — Md S Elahee
(74) *Attorney, Agent, or Firm* — Michael O'Keefe

(57) ABSTRACT

In an approach to generating a digital sentiment signature to characterize an end to a communication, one or more computer processors detect a start of a communication between at least two participants. A computer starts a digital timer of the communication. A computer identifies one or more digital marks of the communication, where the one or more digital marks are a reflection of a sentiment of at least one of the at least two participants in the communication. A computer generates a digital sentiment signature based on the digital timer and on the one or more digital marks, where the digital sentiment signature is a digital signal that can be communicated across a plurality of types of communication channels. A computer detects an end of the communication. A computer determines a reason for the end of the communication. A computer stores the reason.

20 Claims, 3 Drawing Sheets

(51) Int. Cl.
*G10L 15/26* (2006.01)
*G10L 25/51* (2013.01)

(58) Field of Classification Search
CPC ..... G10L 15/26; G10L 15/1815; G10L 25/51; G10L 25/63
USPC .......................................................... 704/270
See application file for complete search history.

(56) References Cited

U.S. PATENT DOCUMENTS

| | | |
|---|---|---|
| 9,860,379 B2 | 1/2018 | Kumar |
| 2002/0045468 A1 | 4/2002 | Jalili |
| 2002/0077086 A1 | 6/2002 | Tuomela |
| 2011/0003554 A1* | 1/2011 | Sekiya ................ H04M 3/2227 |
| | | 455/67.11 |
| 2018/0191895 A1 | 7/2018 | Zhao |
| 2021/0306457 A1* | 9/2021 | Krishnan ................ G06F 40/30 |

* cited by examiner

DIGITAL SENTIMENT SIGNATURE GENERATION

BACKGROUND OF THE INVENTION

The present invention relates generally to the field of digital communication, and more particularly to generating a digital sentiment signature to characterize an end to a communication.

Sentiment analysis refers to the use of natural language processing, text analysis, computational linguistics, and biometrics to systematically identify, extract, quantify, and study affective states and subjective information. Sentiment analysis is widely applied to voice of the customer materials such as reviews and survey responses, online and social media, and healthcare materials for applications that range from marketing to customer service to clinical medicine.

A chatbot is a software application used to conduct an on-line chat communication via text or text-to-speech, in lieu of providing direct contact with a live human agent. Designed to convincingly simulate the way a human behaves as a conversational partner, chatbot systems typically require continuous tuning and testing. Chatbots are used in dialog systems for various purposes including customer service, request routing, or for information gathering. While some chatbot applications use extensive word-classification processes, natural language processors, and sophisticated artificial intelligence (AI), others simply scan for general keywords and generate responses using common phrases obtained from an associated library or database.

SUMMARY

Embodiments of the present invention disclose a computer-implemented method, a computer program product, and a system for generating a digital sentiment signature to characterize an end to a communication. The computer-implemented method may include one or more computer processors detecting a start of a communication between at least two participants. One or more computer processors start a digital timer of the communication. One or more computer processors identify one or more digital marks of the communication, where the one or more digital marks are a reflection of a sentiment of at least one of the at least two participants in the communication. One or more computer processors generate a digital sentiment signature based on the digital timer and on the one or more digital marks, wherein the digital sentiment signature is a digital signal that can be communicated across a plurality of types of communication channels. One or more computer processors detect an end of the communication. One or more computer processors determine a reason for the end of the communication. One or more computer processors store the reason.

DETAILED DESCRIPTION

Cellular and digital mobile telephone devices have become widely used over the past several years. As much as the field has advanced, the quality of transmissions and receptions is not always perfect, and therefore, some phone conversations are abruptly terminated while one or both parties is speaking. Present mobile phones have visual indicators that show the status of calls and offer other features such as address books and email. Sometimes a communication is of poor quality and reception is intermittent. In such cases, one or both parties yell back and forth to see if the other can hear. In other cases, one of the parties may abruptly end the call for other reasons, such as dissatisfaction with customer service.

When a communication, such as a call, text, chat, conversation, etc., is dropped or disconnected, the parties involved may not necessarily know if the communication was completed on purpose, or if there was a sentiment associated with the disconnection, such as positive, negative, or neutral. For example, historically, a party in a phone conversation could slam the phone down to convey displeasure with the conversation. However, with current technologies, it may not be apparent that a call is ended with purpose, versus ending inadvertently. In addition, services like call centers and chatbots could make use of call sentiment data to improve customer service. Embodiments of the present invention recognize that efficiency may be gained by implementing a system that can determine a sentiment associated with the end of a communication by generating a digital sentiment signature and logging the output. Embodiments of the present invention also recognize that by capturing metrics associated with a digital sentiment signature in a log, an analysis of the log can be used to improve the quality of customer service entities. Implementation of embodiments of the invention may take a variety of forms, and exemplary implementation details are discussed subsequently with reference to the Figures.

Figure 1:
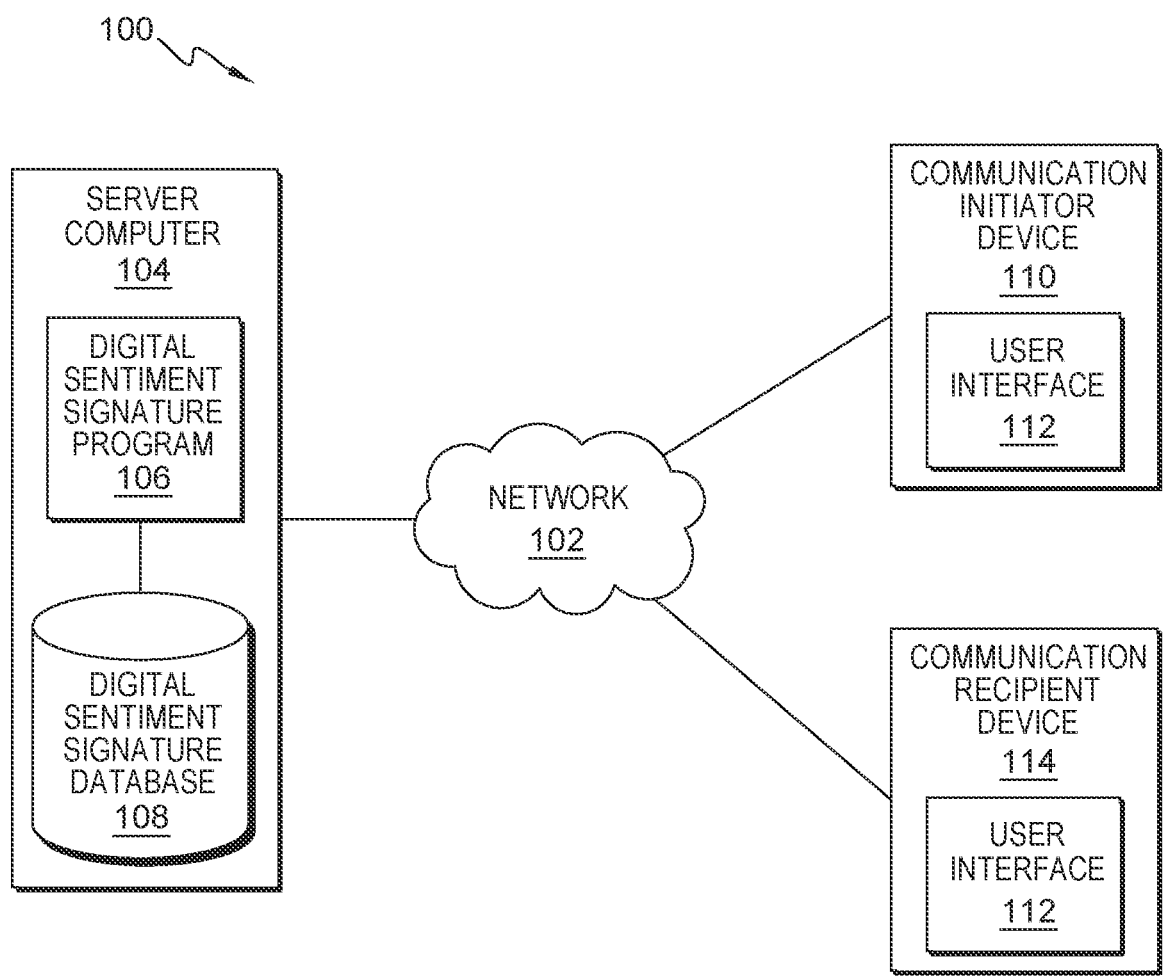
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, communication initiator device 110, and communication recipient device 114 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, communication initiator device 110, communication recipient device 114, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with communication initiator device 110, communication recipient device 114, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes digital sentiment signature program 106 and digital sentiment signature database 108. Server computer 104 may include internal and external hardware components, as depicted and described in further detail with respect to FIG. 3.

Digital sentiment signature program 106 determines sentiment from the end of a communication in order to determine the reason the communication was ended. Digital sentiment signature program 106 detects a communication start and starts a digital timer of the communication. Digital sentiment signature program 106 retrieves digital marks from the communication and generates a digital trail composed of the digital marks. Upon detecting the end of the communication, digital sentiment signature program 106 generates a digital sentiment signature and determines metadata associated with the communication. Digital sentiment signature program 106 determines the reason that the communication ended. Digital sentiment signature program 106 stores the reason for the end of the communication in association with the metadata. Digital sentiment signature program 106 is depicted and described in further detail with respect to FIG. 2.

Digital sentiment signature database 108 stores information used and generated by digital sentiment signature program 106. In the depicted embodiment, digital sentiment signature database 108 resides on server computer 104. In another embodiment, digital sentiment signature database 108 may reside elsewhere within distributed data processing environment 100, provided order digital sentiment signature program 106 has access to digital sentiment signature database 108. A database is an organized collection of data. Digital sentiment signature database 108 can be implemented with any type of storage device capable of storing data and configuration files that can be accessed and utilized by digital sentiment signature program 106, such as a database server, a hard disk drive, or a flash memory. Digital sentiment signature database 108 stores data generated during a communication between conversation participants, including, but not limited to, time intervals of the communication, digital marks of the communication, a digital trail of the communication, a digital sentiment signature of the communication, a reason for the end of the communication, metadata associated with the communication, etc. Digital sentiment signature database 108 also stores data associated with a conversation participant, i.e., a communication initiator and/or a communication recipient, including, but not limited to, name, address, phone number, email address, social network affiliation, credit card number, shopping history, etc. In addition, digital sentiment signature database 108 stores preferences of communication participants regarding the configuration of digital sentiment signature program 106, including, but not limited to, definitions of digital sentiment signatures to be associated with different reasons for a disconnection of a communication, preferred time intervals associated with each of the digital sentiment signatures, etc.

The present invention may contain various accessible data sources, such as digital sentiment signature database 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Digital sentiment signature program 106 enables the authorized and secure processing of personal data. Digital sentiment signature program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Digital sentiment signature program 106 provides information regarding personal data and the nature (e.g., type, scope, purpose, duration, etc.) of the processing. Digital sentiment signature program 106 provides the user with copies of stored personal data. Digital sentiment signature program 106 allows the correction or completion of incorrect or incomplete personal data. Digital sentiment signature program 106 allows the immediate deletion of personal data.

Communication initiator device 110 and communication recipient device 114 can each be one or more of a laptop computer, a tablet computer, a smart phone, a smart watch, a smart speaker, or any programmable electronic device capable of communicating with various components and devices within distributed data processing environment 100, via network 102. Communication initiator device 110 and/or communication recipient device 114 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, communication initiator device 110 and/or communication recipient device 114 may be integrated into a vehicle of the user. For example, communication initiator device 110 and/or communication recipient device 114 may include a heads-up display in the windshield of the vehicle. In general, communication initiator device 110 and communication recipient device 114 each represents one or more programmable electronic devices or combination of programmable electronic devices capable of executing machine readable program instructions and communicating with other computing devices (not shown) within distributed data processing environment 100 via a network, such as network 102. Communication initiator device 110 and communication recipient device 114 each includes an instance of user interface 112.

User interface 112 provides an interface between digital sentiment signature program 106 on server computer 104, and users of communication initiator device 110 and communication recipient device 114. In one embodiment, user interface 112 is mobile application software. Mobile application software, or an "app," is a computer program designed to run on smart phones, tablet computers and other mobile devices. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 112 enables a user of communication initiator device 110 and/or communication recipient device 114 to opt-in or opt-out of digital sentiment signature program 106. Further, user interface 112 enables a user of communication initiator device 110 and/or communication recipient device 114 to create a profile for use by digital sentiment signature program 106, which may include, but is not limited to, a name, an address, an email address, a credit card number, an account number, an employer, etc. User interface 112 also enables a user of communication initiator device 110 and/or communication recipient device 114 to input preferences for use and analysis by digital sentiment signature program 106. In an embodiment, a user of communication initiator device 110 and/or communication recipient device 114 may configure one or more buttons on the device, via user interface 112, to establish a digital sentiment signature the user wishes to convey upon disconnection of the communication. For example, a user may configure a button to convey a satisfactory conclusion of a communication, while the user may also configure a button to convey anger or frustration at the end of a communication, as well as a button to convey an environmental issue with the connection, such as static or a delay. In response to the user pressing the button, the user exits the communication, and digital sentiment signature program 106 generates the appropriate digital sentiment signature signal and transmits the signal to the other parties in the communication. If, for example, the user pressed the button associated with frustration, then the remaining parties on the communication receive the digital sentiment signature from digital sentiment signature program 106 and are thus notified of the user's sentiment. In another embodiment, instead of a button, the user may configure, via user interface 112, a sound or word that the user can speak or type to conclude a communication and indicate the associated digital sentiment signature to digital sentiment signature program 106.

Figure 2:
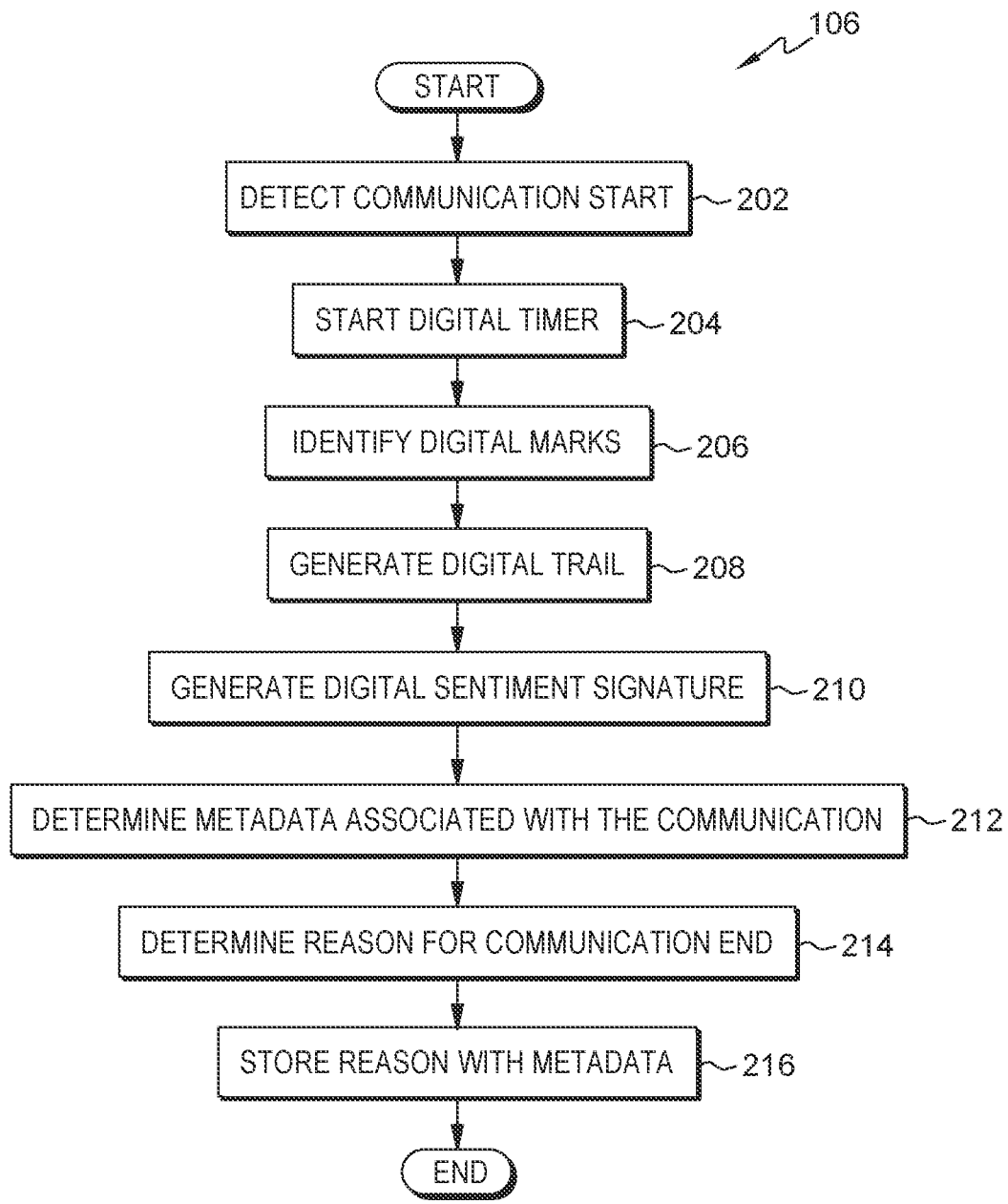
FIG. 2 is a flowchart depicting operational steps of a digital sentiment signature program, on a server computer within the distributed data processing environment of FIG. 1, for generating a digital sentiment signature to characterize an end to a communication, in accordance with an embodiment of the present invention.

FIG. 2 is a flowchart depicting operational steps of digital sentiment signature program 106, on server computer 104 within distributed data processing environment 100 of FIG. 1, for generating a digital sentiment signature to characterize an end to a communication, in accordance with an embodiment of the present invention.

Digital sentiment signature program 106 detects a communication start (step 202). In an embodiment, digital sentiment signature program 106 detects the beginning of a communication between at least two parties. In an embodiment, one of the parties is the initiator of the communication, for example, a user of communication initiator device 110. In an embodiment, one or more of the parties is a recipient of the communication, for example, a user of communication recipient device 114. In an embodiment, the user of communication recipient device 114 is an employee of a customer service call center. In another embodiment, the user of communication recipient device 114 is a customer service chatbot. When a communication recipient engages in the communication with the initiator, digital sentiment signature program 106 detects the communication start. In one embodiment, the communication is via a phone call, either wired or cellular. In another embodiment, the communication is via text messages. In a further embodiment, the communication may include one or more of video, audio, and text techniques known in the art.

Digital sentiment signature program 106 starts a digital timer (step 204). In an embodiment, when a communication channel is established, digital sentiment signature program 106 starts a digital timer to record the length of the communication prior to disconnection to enable a comparison of the length of the communication to pre-defined time intervals associated with a digital sentiment signature. In one embodiment, digital sentiment signature program 106 stores default time intervals in digital sentiment signature database 108. In another embodiment, users of communication initiator device 110 and communication recipient device 114 configure time intervals in association with digital sentiment signatures via user interface 112, and digital sentiment signature program 106 receives the time intervals and stores them in digital sentiment signature database 108. For example, a time interval of 20 seconds can be defined to be associated with an inadvertent disconnection by either the initiator or recipient. In one embodiment, the time intervals may also be associated with a location of communication initiator device 110 and communication recipient device 114. For example, a time interval defined to be associated with a call abandonment may be shorter if the device is located at a work location versus a home location. In another embodiment, a communication initiator may define a time interval based on the communication recipient. For example, a communication initiator may define a first time interval associated with an inadvertent disconnection to be long if the communication recipient is a co-worker of the communication initiator and may define a second time interval associated with an inadvertent disconnection to be short if the communication is with a chatbot. In an embodiment, communication participants may exchange the value of one or more time intervals, via user interface 112, so that each party is aware of the how the other parties defined the digital sentiment signatures. For example, the parties may exchange the pre-defined time interval for inadvertent disconnection, such that if one of the parties disconnects within that time interval, the other parties will understand that the disconnection was inadvertent.

Digital sentiment signature program 106 identifies digital marks from the communication (step 206). In an embodiment, a digital mark is a reflection of a sentiment of a participant in a communication or conversation. In an embodiment, digital sentiment signature program 106 uses one or more natural language processing (NLP) techniques to assess a sentiment in a communication. For example, digital sentiment signature program 106 may determine a communication participant is angry by detecting a pitch or decibel level of the participant's voice is increased or by detecting an expletive in the text of the communication. In an embodiment, a digital mark exists for each sentiment and is stored in digital sentiment signature database 108. Responsive to determining a sentiment in a communication, digital sentiment signature program 106 retrieves the associated digital mark from digital sentiment signature database 108.

Digital sentiment signature program 106 generates a digital trail (step 208). In an embodiment, a digital trail is a chronological log of digital marks associated with a conversation or communication. In an embodiment, digital sentiment signature program 106 includes in the digital trail a time at which a digital mark is identified, based on the digital timer. In an embodiment, digital sentiment signature program 106 generates the digital trail by aggregating the retrieved digital marks as the communication proceeds toward an end. By generating the digital trail, digital sentiment signature program 106 documents a possible progression of sentiments. For example, the digital trail may indicate that a caller to a customer service number starts out happy but gets progressively frustrated as the call goes on. In an embodiment, a digital trail may also document a route taken by a caller, such as steps in a call tree. For example, if a communication initiator calls a store to determine the hours of operation, and follows a menu of instructions of which number to press in order to get to the hours operation, then the digital trail may be a list of keystrokes, such as 1 #, 4 #, 3 #.

Digital sentiment signature program 106 generates a digital sentiment signature (step 210). In an embodiment, a digital sentiment signature is a digital signal that can be communicated across a plurality of types of communication channels. In one embodiment, the digital signal can be a sound. In an embodiment, digital sentiment signature program 106 detects the end of the communication and generates a digital sentiment signature associated with the end of the communication. Digital sentiment signature program 106 determines the total time interval of the communication from the digital timer. Digital sentiment signature program 106 also determines a sentiment of the parties in the communication from the digital trail. Based on the time interval and the digital trail, digital sentiment signature program 106 generates a digital sentiment signature associated with the end of the communication. Digital sentiment signature program 106 generates a different digital sentiment signature for each type of communication disconnect, based on the sentiment determined from the digital trail. For example, digital sentiment signature program 106 can generate a digital sentiment signature associated with an inadvertent disconnect versus a purposeful disconnect. In one embodiment, if a communication was ended inadvertently, then digital sentiment signature program 106 generates a digital sentiment signature that can alert the parties in the communication to attempt to reconnect. In an embodiment, digital sentiment signature program 106 retrieves the digital sentiment signature from one or more digital sentiment signatures stored in digital sentiment signature database 108. In an embodiment where a user of communication initiator device 110 and/or communication recipient device 114 configured a method to establish a digital sentiment signature the user wishes to convey upon disconnection of the communication, digital sentiment signature program 106 generates the appropriate digital sentiment signature signal in response to the user initiating the configured method. In an embodiment, digital sentiment signature program 106 appends the digital sentiment signature to the end of the digital trail. In an embodiment where a participant in the communication, whether a person or a chatbot, receives the generated digital sentiment signature upon the end of the communication, the participant can learn from the signature whether or not the disconnected participant was satisfied with the communication or not, and can use that knowledge to improve future communications.

Digital sentiment signature program 106 determines metadata associated with the communication (step 212). In an embodiment, digital sentiment signature program 106 determines the time interval of the communication, the digital trail, and the digital sentiment signature as metadata associated with the completed communication.

Digital sentiment signature program 106 determines a reason for the communication end (step 214). In an embodiment, in response to detecting an end to the communication, digital sentiment signature program 106 analyzes the metadata, i.e., the time interval of the communication, the digital trail, and the digital sentiment signature, to determine a reason for the end of the communication. Reasons for the end of the communication may include, but are not limited to, an inadvertent disconnection (e.g., one of the parties drops the phone and disconnects the call), experiencing a bad connection (e.g., static is present or the audio is interrupted due to loss of power or lightening), an abandonment of the communication (e.g., a caller to a retail store is on hold for too long and hangs up), or the communication was complete (e.g., a chat with a customer service chatbot is successfully concluded). Based on the analysis of the metadata, digital sentiment signature program 106 determines a reason for the end of the communication.

Digital sentiment signature program 106 stores the reason with the metadata (step 216). In an embodiment, digital sentiment signature program 106 stores the reason for the end to the communication in association with the metadata associated with the communication in digital sentiment signature database 108. In an embodiment, digital sentiment signature program 106 outputs the metadata and the reason to a file for later analysis by a data scientist. The data scientist may analyze the data for quality assurance purposes. In another embodiment, digital sentiment signature program 106 outputs the metadata and the reason to an AI engine, and the AI engine can analyze the data for additional training data and improvement to chatbot performance.

In an example, a call center for campground reservations monitors communications with callers for quality assurance. In the call center, agents are monitored for end-to-end user experience. In the example, a caller contacts the call center to make a campground reservation at a national park. While the agent does an online search for the national park, there is a long lag time. The long lag time when searching for available camp sites may be attributed to poor search data, an issue with the search website, a long time to process the request, etc. The caller may abandon the call or wait, possibly impatiently, for the agent to return with the requested information. In an embodiment of the present invention, when the call center agent answers the call, digital sentiment signature program 106 starts a digital timer, as discussed with respect to step 204. As the call continues, digital sentiment signature program 106 retrieves digital marks, as discussed with respect to step 206, and generates a digital trail, as discussed with respect to step 208. If, for example, the call ends after the pre-defined time interval associated with a call abandonment, then digital sentiment signature program 106 generates a digital sentiment signature associated with call abandonment, as discussed with respect to step 210. Then, based on metadata associated with the call, as discussed with respect to step 212, digital sentiment signature program 106 determines a reason for the end of the call, as discussed with respect to step 214, and stores the metadata with the reason, as discussed with respect to step 216. A quality assurance person for the call center can review the reason and the metadata for that call, and other calls, in order to understand any issues with the calls and determine how to improve the customer experience in the future. In one embodiment, an artificial intelligence (AI) engine analyzes the stored metadata and reasons to generate recommendations for improvements to the call center experience.

Figure 3:
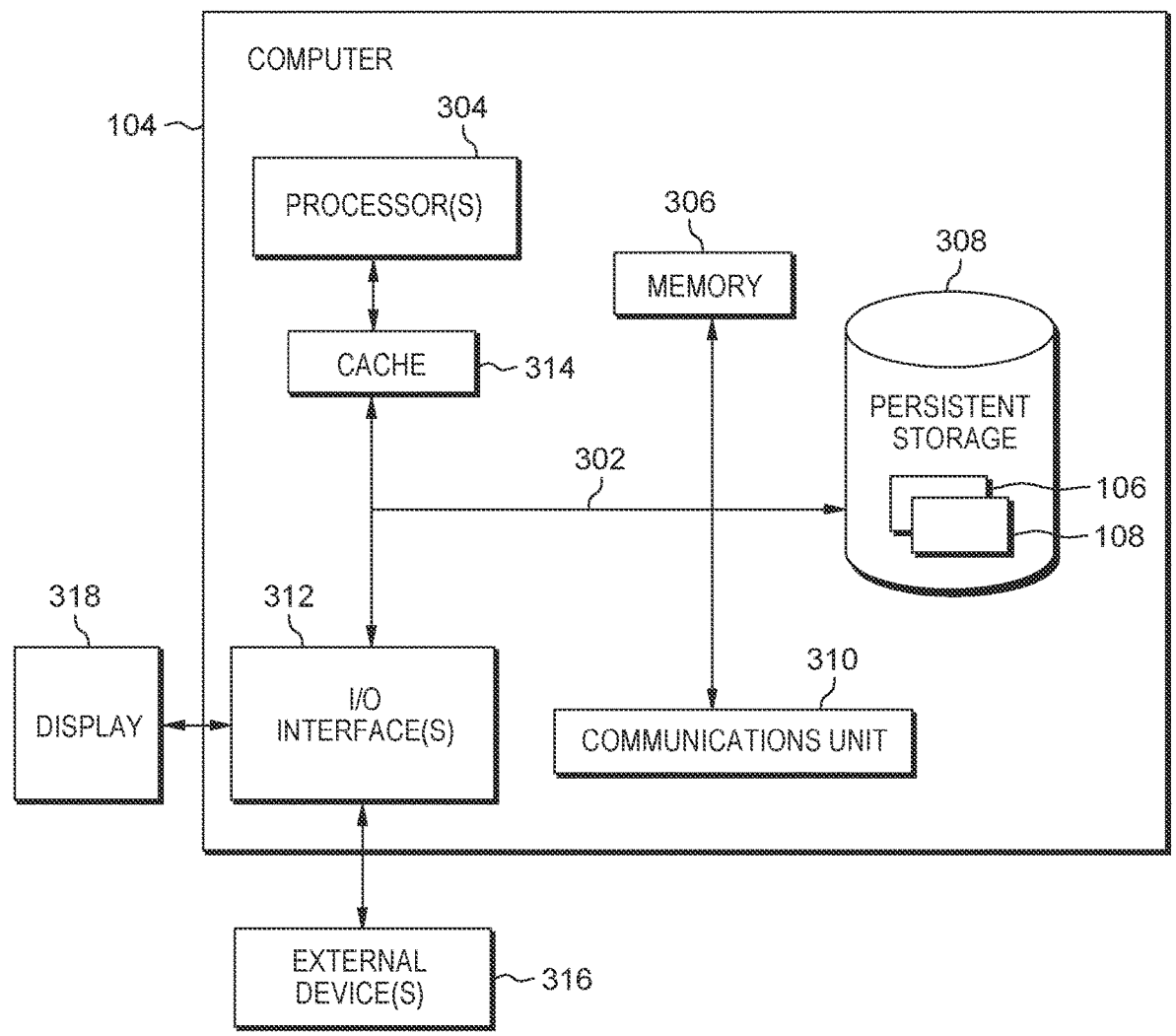
FIG. 3 depicts a block diagram of components of the server computer executing the digital sentiment signature program within the distributed data processing environment of FIG. 1, in accordance with an embodiment of the present invention.

FIG. 3 depicts a block diagram of components of server computer 104 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 104 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., digital sentiment signature program 106 and digital sentiment signature database 108, are stored in persistent storage 308 for execution and/or access by one or more of the respective processor(s) 304 of server computer 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of communication initiator device 110 and communication recipient device 114. In these examples, communications unit 310 includes one or more network interface cards. Communications unit 310 may provide communications through the use of either or both physical and wireless communications links. Digital sentiment signature program 106, digital sentiment signature database 108, and other programs and data used for implementation of the present invention, may be downloaded to persistent storage 308 of server computer 104 through communications unit 310.

I/O interface(s) 312 allows for input and output of data with other devices that may be connected to server computer 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., digital sentiment signature program 106 and digital sentiment signature database 108 on server computer 104, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
detecting, by one or more computer processors, a start of a communication between at least two participants;
starting, by one or more computer processors, a digital timer of the communication;
determining, by one or more computer processors, one or more sentiments of at least one of the at least two participants in the communication;
retrieving, by one or more computer processors, one or more digital marks of the communication, wherein the one or more digital marks are each associated with a sentiment of the one or more sentiments of at least one of the at least two participants in the communication;
detecting, by one or more computer processors, an end of the communication;
based on the digital timer and on the one or more digital marks, determining, by one or more computer processors, a reason for the end of the communication;
retrieving, by one or more computer processors, a digital sentiment signature signal corresponding to the reason for the end of the communication;

communicating, by one or more computer processors, the digital sentiment signature signal to at least one of the at least two participants; and storing, by one or more computer processors, the reason.

2. The computer-implemented method of claim 1, further comprising:

determining, by one or more computer processors, metadata associated with the communication; and storing, by one or more computer processors, the metadata in association with the reason for the end of the communication.

3. The computer-implemented method of claim 2, wherein the metadata includes a time interval of the communication, the one or more digital marks, and the digital sentiment signature.

4. The computer-implemented method of claim 1, further comprising:

generating, by one or more computer processors, a digital trail based on the identified one or more digital marks, wherein the digital trail is a chronological log of the one or more digital marks associated with the communication.

5. The computer-implemented method of claim 1, wherein the reason for the end of the communication is selected from the group consisting of: at least one of the at least two participants abandoning the communication, at least one of the at least two participants experiencing a bad connection, at least one of the at least two participants inadvertently ending the communication, and at least one of the at least two participants concluding the communication.

6. The computer-implemented method of claim 1, wherein the digital sentiment signature signal is a sound.

7. The computer-implemented method of claim 1, further comprising:

receiving, by one or more computer processors, a configuration for the digital sentiment signature signal from at least one of the at least two participants in the communication.

8. A computer program product comprising:

one or more computer readable storage media and program instructions collectively stored on the one or more computer readable storage media, the stored program instructions comprising:

program instructions to detect a start of a communication between at least two participants;

program instructions to start a digital timer of the communication;

program instructions to determine one or more sentiments of at least one of the at least two participants in the communication;

program instructions to retrieve one or more digital marks of the communication, wherein the one or more digital marks are a each associated with a sentiment of the one or more sentiments of at least one of the at least two participants in the communication;

program instructions to detect an end of the communication;

based on the digital timer and on the one or more digital marks, program instructions to determine a reason for the end of the communication;

program instructions to retrieve a digital sentiment signature signal corresponding to the reason for the end of the communication;

program instructions to communicate the digital sentiment signature signal to at least one of the at least two participants; and program instructions to store the reason.

9. The computer program product of claim 8, the stored program instructions further comprising:

program instructions to determine metadata associated with the communication; and program instructions to store the metadata in association with the reason for the end of the communication.

10. The computer program product of claim 9, wherein the metadata includes a time interval of the communication, the one or more digital marks, and the digital sentiment signature.

11. The computer program product of claim 8, the stored program instructions further comprising:

program instructions to generate a digital trail based on the identified one or more digital marks, wherein the digital trail is a chronological log of the one or more digital marks associated with the communication.

12. The computer program product of claim 8, wherein the reason for the end of the communication is selected from the group consisting of: at least one of the at least two participants abandoning the communication, at least one of the at least two participants experiencing a bad connection, at least one of the at least two participants inadvertently ending the communication, and at least one of the at least two participants concluding the communication.

13. The computer program product of claim 8, wherein the digital sentiment signature signal is a sound.

14. The computer program product of claim 8, the stored program instructions further comprising:

program instructions to receive a configuration for the digital sentiment signature signal from at least one of the at least two participants in the communication.

15. A computer system comprising:

one or more computer processors;

one or more computer readable storage media;

program instructions collectively stored on the one or more computer readable storage media for execution by at least one of the one or more computer processors, the stored program instructions comprising:

program instructions to detect a start of a communication between at least two participants;

program instructions to start a digital timer of the communication;

program instructions to determine one or more sentiments of at least one of the at least two participants in the communication;

program instructions to retrieve one or more digital marks of the communication, wherein the one or more digital marks are a each associated with a sentiment of the one or more sentiments of at least one of the at least two participants in the communication;

program instructions to detect an end of the communication;

based on the digital timer and on the one or more digital marks, program instructions to determine a reason for the end of the communication;

program instructions to retrieve a digital sentiment signature signal corresponding to the reason for the end of the communication;

program instructions to communicate the digital sentiment signature signal to at least one of the at least two participants; and program instructions to store the reason.

16. The computer system of claim 15, the stored program instructions further comprising:

program instructions to determine metadata associated with the communication; and program instructions to store the metadata in association with the reason for the end of the communication.

17. The computer system of claim 16, wherein the metadata includes a time interval of the communication, the one or more digital marks, and the digital sentiment signature.

18. The computer system of claim 15, the stored program instructions further comprising:
program instructions to generate a digital trail based on the identified one or more digital marks, wherein the digital trail is a chronological log of the one or more digital marks associated with the communication.

19. The computer system of claim 15, wherein the reason for the end of the communication is selected from the group consisting of: at least one of the at least two participants abandoning the communication, at least one of the at least two participants experiencing a bad connection, at least one of the at least two participants inadvertently ending the communication, and at least one of the at least two participants concluding the communication.

20. The computer system of claim 15, wherein the digital sentiment signature signal is a sound.

\* \* \* \* \*